United States Patent
Gupta et al.

(10) Patent No.: US 10,471,927 B1
(45) Date of Patent: Nov. 12, 2019

(54) TETHERED AIRBAGS

(71) Applicant: Waymo LLC, Mountain View, CA (US)

(72) Inventors: Atul Gupta, San Jose, CA (US); Peter Craig Lombrozo, Santa Cruz, CA (US); Daniel Lynn Larner, San Jose, CA (US)

(73) Assignee: WAYMO LLC, Mountain View, CA (US)

( * ) Notice: Subject to any disclaimer, the term of this patent is extended or adjusted under 35 U.S.C. 154(b) by 65 days.

(21) Appl. No.: 15/703,312

(22) Filed: Sep. 13, 2017

(51) Int. Cl.
*B60R 21/00* (2006.01)
*B60R 21/36* (2011.01)
*B60R 21/0134* (2006.01)
*B60R 21/01* (2006.01)

(52) U.S. Cl.
CPC .......... *B60R 21/36* (2013.01); *B60R 21/0134* (2013.01); *B60R 2021/01211* (2013.01)

(58) Field of Classification Search
CPC ..... B60R 21/00; B60R 21/36; B60R 21/0134; B60R 2021/01211; F42B 3/04
See application file for complete search history.

(56) References Cited

U.S. PATENT DOCUMENTS

| | | | |
|---|---|---|---|
| 6,419,262 B1 * | 7/2002 | Fendt | B60R 21/231 280/729 |
| 7,040,653 B1 * | 5/2006 | Breed | B60R 21/2032 280/731 |
| 7,066,487 B2 * | 6/2006 | Sullivan | B60R 21/233 280/729 |
| 7,845,454 B2 | 12/2010 | Takimoto et al. | |
| 9,132,799 B1 | 9/2015 | Choi | |
| 2003/0178832 A1 * | 9/2003 | Dominissini | B60R 21/201 280/743.2 |
| 2004/0074688 A1 * | 4/2004 | Hashimoto | B60R 21/2155 180/271 |
| 2005/0188875 A1 * | 9/2005 | Matsuda | B60R 21/017 102/206 |
| 2009/0278341 A1 * | 11/2009 | Kim | B60R 21/233 280/743.2 |
| 2010/0270780 A1 * | 10/2010 | Moritani | B60R 21/206 280/730.1 |
| 2010/0295271 A1 * | 11/2010 | Shimazaki | B60R 21/201 280/728.2 |

(Continued)

FOREIGN PATENT DOCUMENTS

| | | |
|---|---|---|
| DE | 202014003474 U1 | 7/2015 |
| EP | 1992526 A2 | 11/2008 |
| JP | 201513456 A | 1/2015 |

*Primary Examiner* — Yonel Beaulieu
(74) *Attorney, Agent, or Firm* — Botos Churchill IP Law LLP

(57) ABSTRACT

Aspects of the disclosure relate to airbag systems for vehicles. The airbag systems may prevent the airbags from splitting apart during impact with a pedestrian or object. The airbag system may include a first airbag attached to a first connector and a second airbag attached to a second connector. The airbag system may also include a tether attached to the first connector and the second connector, and wherein the tether is configured to be pulled taut upon the first or second airbag being deployed in an environment of a vehicle in order to reduce the likelihood of an object colliding directly with the vehicle.

19 Claims, 10 Drawing Sheets

(56) References Cited

U.S. PATENT DOCUMENTS

| | | | |
|---|---|---|---|
| 2012/0133114 A1* | 5/2012 | Choi | B60R 21/214 |
| | | | 280/728.2 |
| 2012/0256400 A1* | 10/2012 | Shimono | B60R 21/207 |
| | | | 280/729 |
| 2016/0355152 A1* | 12/2016 | Perez Garcia | B60R 21/36 |
| 2018/0093635 A1* | 4/2018 | Mallinger | B60R 21/2338 |

* cited by examiner

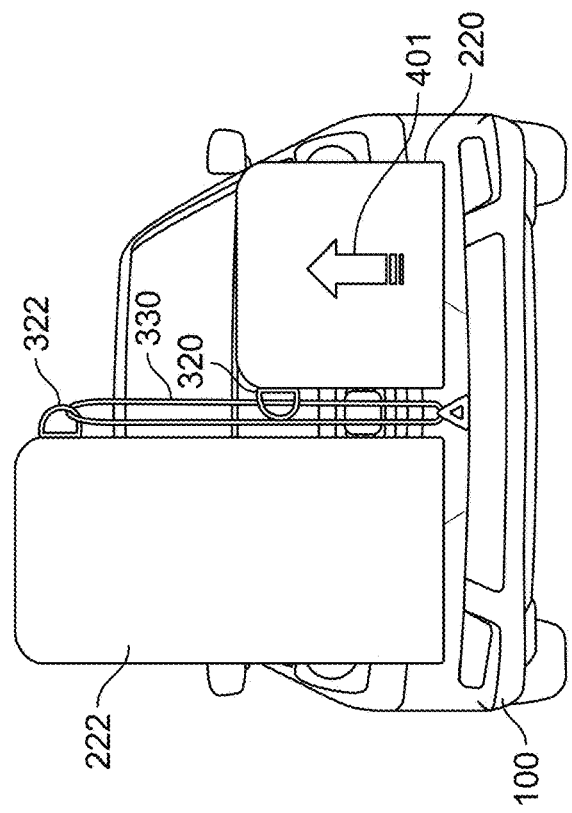
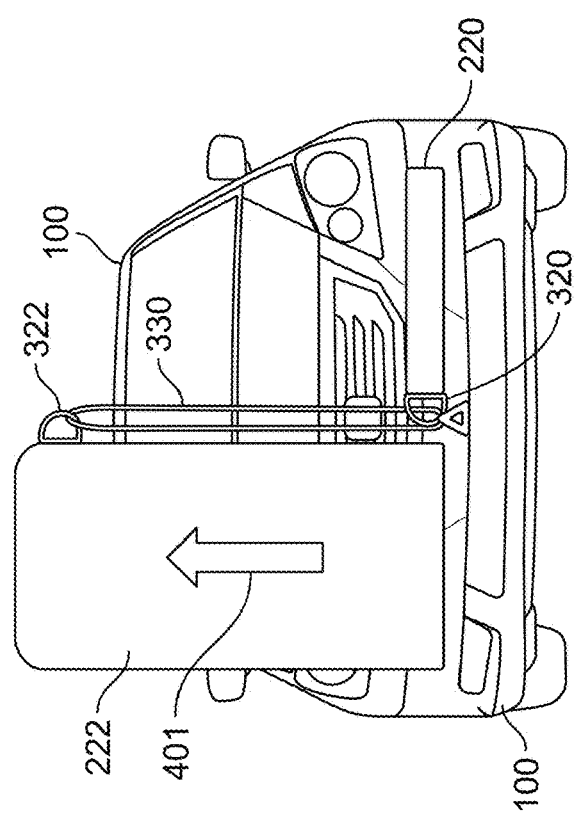

TETHERED AIRBAGS

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as deciding when to speed up, slow down, stop, turn, etc. These decisions are used to maneuver between locations but also to interact with and avoid collisions with other objects along the way.

When a collision actually occurs, non-autonomous and autonomous vehicles alike may include various safety mechanisms to reduce injury to passengers. Typically, the safety mechanisms may include airbag systems employed to protect passengers from impacts with the interior of a vehicle after an object external to a vehicle has impacted a bumper or other portion of the vehicle.

BRIEF SUMMARY

Embodiments within the disclosure relate generally to airbag systems. The airbag system may include comprise a first airbag attached to a first connector, a second airbag attached to a second connector, and a tether attached to the first connector and the second connector, and wherein the tether is configured to be pulled taut upon the first or second airbag being deployed in an environment of a vehicle in order to reduce the likelihood of an object colliding directly with the vehicle.

In some embodiments the tether may be attached to the vehicle at a first end.

In some embodiments the tether may be configured to be pulled taut by the first or second connector pulling on a second, opposite end upon the first or second airbag being deployed.

In some embodiments the second airbag may be configured to be deployed subsequently to the first airbag. The second connector may be configured to slide along the taut tether.

In some embodiments the second airbag may be configured to be deployed simultaneously to the first airbag. The second connector may be configured to pull the tether taut.

In some embodiments the first and second airbags may be positioned adjacent to each other. The tether may be positioned between the first and second airbags.

In some embodiments the airbag system may include a third connector attached to the first airbag, a fourth connector attached to the second airbag, and a second tether, wherein the third and fourth connectors are attached to the second tether and the second tether is configured to be pulled taut upon the third or fourth airbag being deployed.

In some embodiments the second airbag may be configured to be positioned above the first airbag after being deployed.

In some embodiments the vehicle's environment is the vehicle's interior and the first and second airbags are interior airbags.

In some embodiments the vehicle's environment is the vehicle's exterior and the first and second airbags are external airbags.

In some embodiments the airbag system is positioned on the vehicle.

In some embodiments the first and second airbags, the tether, and the first and second connectors may be stored in a compartment attached to the vehicle.

Another aspect includes a method for deploying airbags in a vehicle's vicinity in order to reduce the likelihood of an object colliding directly with the vehicle. The method may include deploying a first airbag attached to a first connector, deploying a second airbag attached to a second connector, wherein the first connector pulls a tether taut and the second connector slides along the taut tether.

Another aspect includes a method for deploying airbags in a vehicle's vicinity in order to reduce the likelihood of an object colliding directly with the vehicle. The method may include determining, by one or more processors, a collision with the object is imminent, predicting, by the one or more processors, a location on the vehicle where the collision with the object is expected to occur, determining an airbag system at the location on the vehicle where the collision is expected to occur, sending, by the one or more processors, a triggering signal to deploy the airbag system, and in response to receiving the triggering signal, deploying by one or more processors, a first airbag attached to a first connector and second airbag attached to a second connector, the first connector and second connector being attached to a tether and the tether, and wherein deploying the first airbag and the second airbag causes the tether to be pulled taut.

BRIEF DESCRIPTION OF THE DRAWINGS

FIGS. 4A-4C are example illustrations of external airbags being deployed in accordance with aspects of the disclosure.

DETAILED DESCRIPTION

Overview

Figure 1:
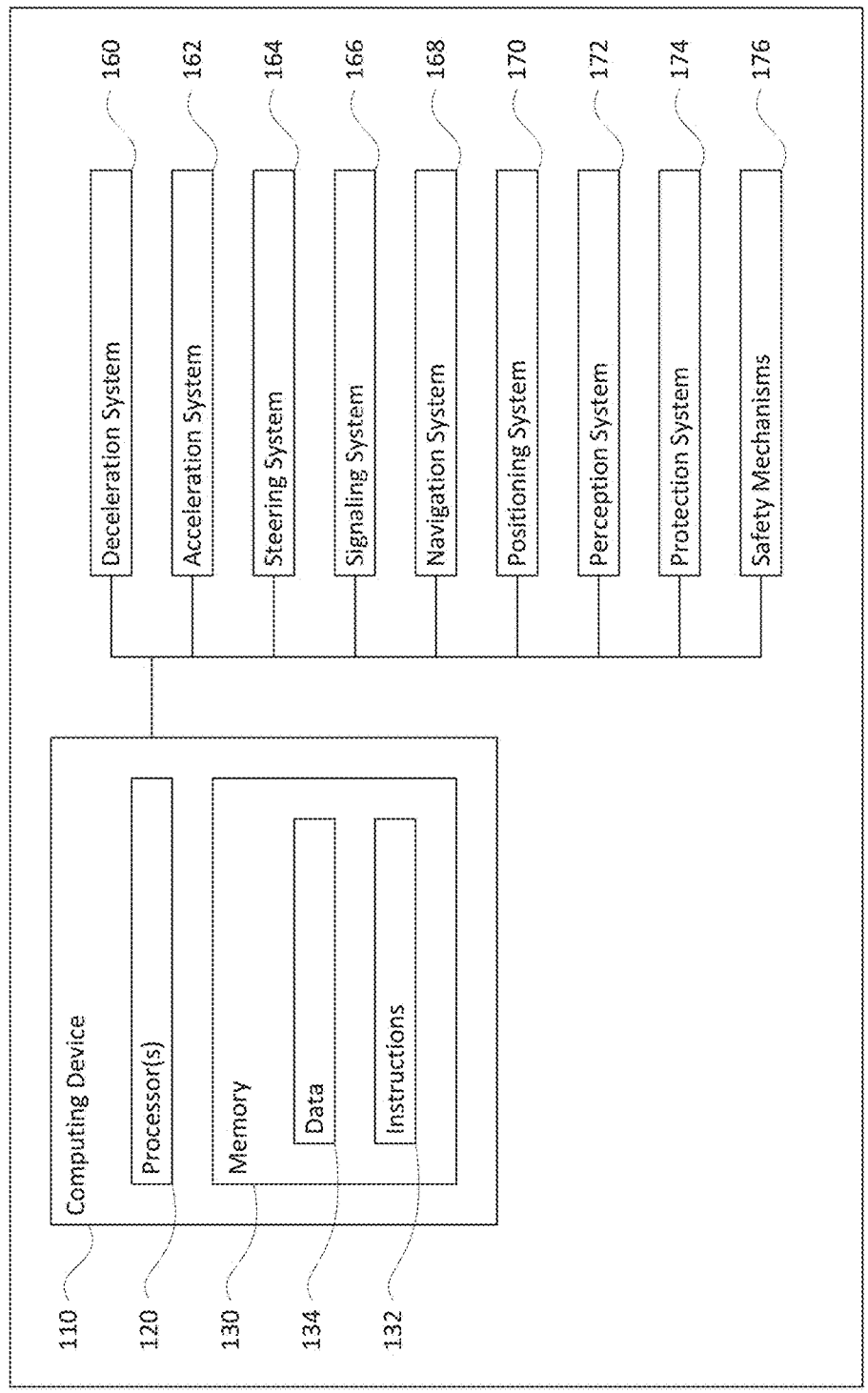
FIG. 1 is a functional diagram of an example vehicle in accordance with aspects of the disclosure.

This technology relates to external airbags which reduce the potential of impact injuries to pedestrians or other objects impacted by a vehicle. For example, computing devices within a vehicle may determine that an impact with an object, such as a pedestrian, cannot be avoided by way of braking, steering, and/or accelerating the vehicle. When this is the case, the computing devices may release an external airbag to absorb the initial impact of the pedestrian and stop the pedestrian from making direct contact with the vehicle.

The vehicle may be equipped with two or more airbags which may be sequentially deployed upon the vehicle detecting imminent impact with a pedestrian or other object. In one example, a pair of airbags may be arranged side by side. Each airbag may include one or more connectors, such as a loop or pulley, which are attached to a tether. The tether may be a single loop which passes through the connectors of two or more adjacent airbags. In this regard, the tether may be positioned in between adjacent airbags. Multiple connectors may be used to join the airbags to the tether, or to multiple tethers, at several locations. Interior airbags may also be tethered together to protect occupants of the vehicle.

Each tethered airbag may be sequentially (or simultaneously) and selectively deployed. In this regard, sensor systems may determine an impact location where impact with a pedestrian or object is going to occur. The sensor system may then trigger the two or more airbags connected via a tether nearest to the impact location, or another determined airbag, to deploy or inflate. Once one of the airbags is deployed, the connector on that airbag may cause the tether to be pulled taut. Subsequently or at the same time, the other airbags attached to the tether may also be deployed and guided along the tether as the connector of the adjacent airbag travels along the taut tether.

The airbags may also be positioned vertically, relative to each other. In this regard, a first airbag may deploy above or below another airbag relative to the ground. A connector on the first airbag may pull a tether taut. A second airbag may be subsequently or simultaneously deployed and guided along the tether above or below the first airbag.

The tether may prevent the two or more airbags from splitting apart during impact with a pedestrian or object. Further, the tether may add torsional rigidity to each of the airbags, thereby reducing the risk of the airbags rotating upon impact and not sufficiently reducing the impact forces felt by the pedestrian or object. Moreover, by using a plurality of smaller airbags to cover a portion of the vehicle in place of a single, larger airbag, readily available airbag inflation and storage mechanisms may be used. The smaller airbags may require less inflation time relative to the larger airbag.

The features described above may allow for improved safety around a vehicle. In this regard, the vehicle may offer safety measures to individuals and objects outside of the vehicle. Accordingly, vehicles can operate in environments close to pedestrians and other external objects with a reduced chance of causing injury or damage to the pedestrians or objects in the case of an inadvertent collision.

In addition, as discussed in detail below, the features described herein allow for various alternatives.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, and protection system 174 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, data 132 and instructions 134.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 170 may include lasers, sonar, radar, cameras and/or any other detection devices that record data which may be processed by computing device 110. In the case where the vehicle is a small passenger vehicle such as a car, the car may include a laser sensor 214 (shown in FIGS. 2A and 2B) or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

The sensors of perception system 172 may detect objects in the vehicle's environment as well as characteristics of those objects such as their location, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

As discussed in more detail below, information from the perception system may be sent to various other systems in order to make decisions about when and how to deploy various safety mechanisms. In this regard, the perception system may send the information to the vehicle's computing devices which make such decisions and forward activation instructions to protection system 174 which deploys one or more safety mechanisms 176 in accordance with the activation instructions. In another example, the perception system 172 may forward the information directly to the protection system 174 which may make a determination whether and how to deploy one or more safety mechanisms 176.

Thus, the vehicle may also include a plurality of safety mechanisms 176. These safety mechanisms may be configured to reduce the likelihood of damage to objects outside of the vehicle as opposed to those meant to specifically protect passengers inside the vehicle. At least some of these safety mechanisms may be active, in that the device must be activated or deployed by a signal generated by one or more computing devices when an impact is imminent.

Figure 2A:
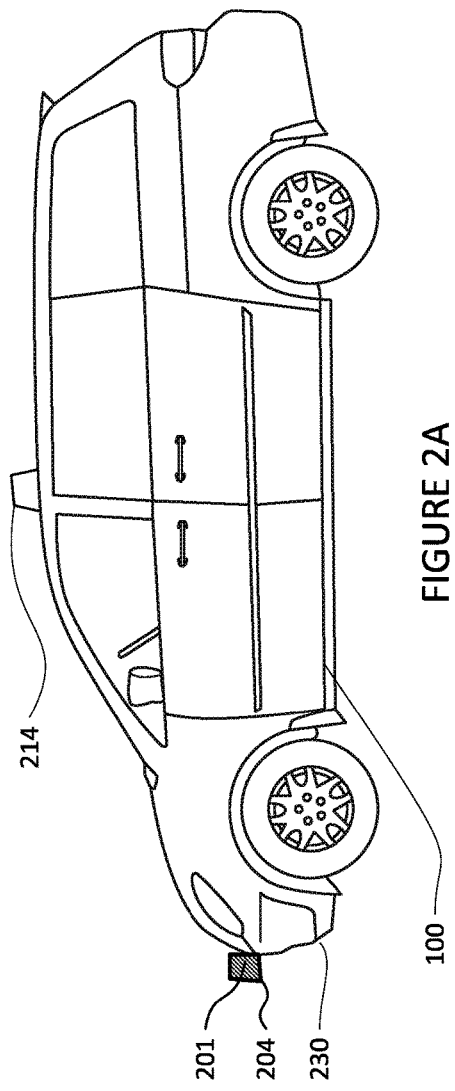
FIGS. 2A and 2B are example external views of a vehicle in accordance with aspects of the disclosure.

The one or more safety mechanisms 176 may include one or more airbag systems, including an active external airbag system having at least two external airbags. Prior to deployment, external airbags may be mounted to a vehicle internally or externally. For example, prior to deployment, a plurality of external airbags of an active external airbag system 201 may be stored in one or more compartments within the vehicle. For example, as shown in FIG. 2A, external airbags the airbag system 201 may be stored in compartment 204 of the vehicle's front bumper 230. In some embodiments, such compartment 204 may be mounted anywhere on or within the vehicle. For instance, compartments housing one or more external airbags may be mounted within the front bumper 230, rear bumper or trunk of the vehicle, within the vehicles doors, or attached to the exterior of the vehicle. In this regard, the external airbag systems may include multiple external airbags.

Figure 2B:
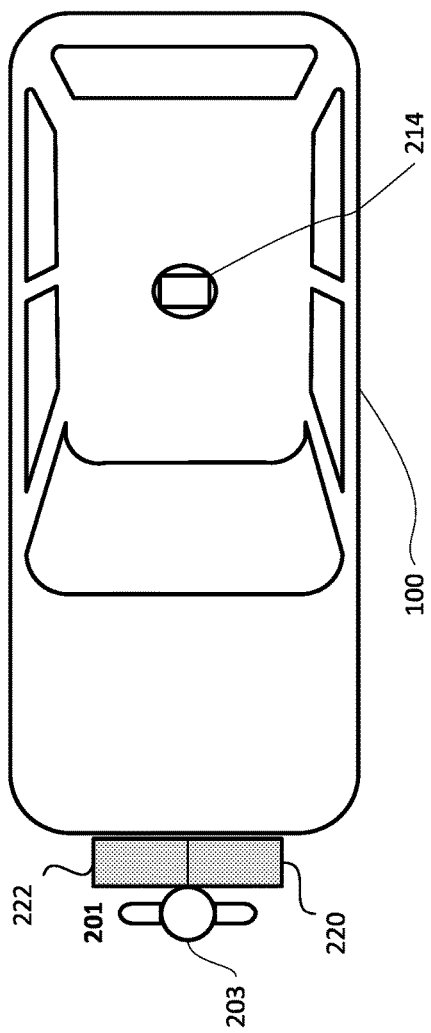

The external airbags of airbag system may be designed to deploy and expand upon the vehicle detecting an imminent impact. For instance, using information received from the vehicle's perception system 172, the computing device 110, may determine that an impact with an object, such as a pedestrian, is imminent. In response, the computing device may provide this information to the protection system 174 which selects or identifies external airbags of the airbag system 201 for deployment according to the circumstances, for instance the location relative of the imminent impact to the vehicle, as provided in the computing devices. Thus, where appropriate, the protection system 174 may send a signal to the safety mechanisms 176 (including the external airbags 220 and 222) in order to deploy the external airbags 220 and 222 of the airbag system 201. Upon receiving the signal to deploy, the external airbags 220 and 222 may be inflated or filled to an expanded state, as shown in FIG. 2B.

As with a typical airbag, the external airbags may be configured to absorb the initial impact forces. In this regard, external airbags 220 and 222 may be comprised of nylon, polyester, and/or other such materials typically used to make airbags.

In addition, the external airbags 220 and 222 may be configured to cover or block a portion of the vehicle 100 with which the pedestrian 203 is projected to impact. For example, as further shown in FIG. 2B, when an impact between the vehicle 100 and the pedestrian 203 is determined to be imminent, the external airbags 220 and 222 may be configured such that they deploy in a vertical orientation extending from around ground level, upward. This may allow the external airbags to block the pedestrian 203 from making contact with the portion of the vehicle 100 with which the pedestrian is projected to impact. Thus, the external airbags 220 and 222 may be configured such that they act as a barrier blocking the pedestrian 203 from hitting the hood panel and/or windshield at the front end of the vehicle, as shown in FIG. 2B. Alternatively, when an impact with the pedestrian 203 is projected to occur at a different portion of the vehicle 100, such as the rear end of the vehicle, different external airbags of the external airbag system may be deployed in order to cover that portion of the vehicle (e.g., the rear windshield and/or tailgate or trunk of the vehicle).

Figure 3:
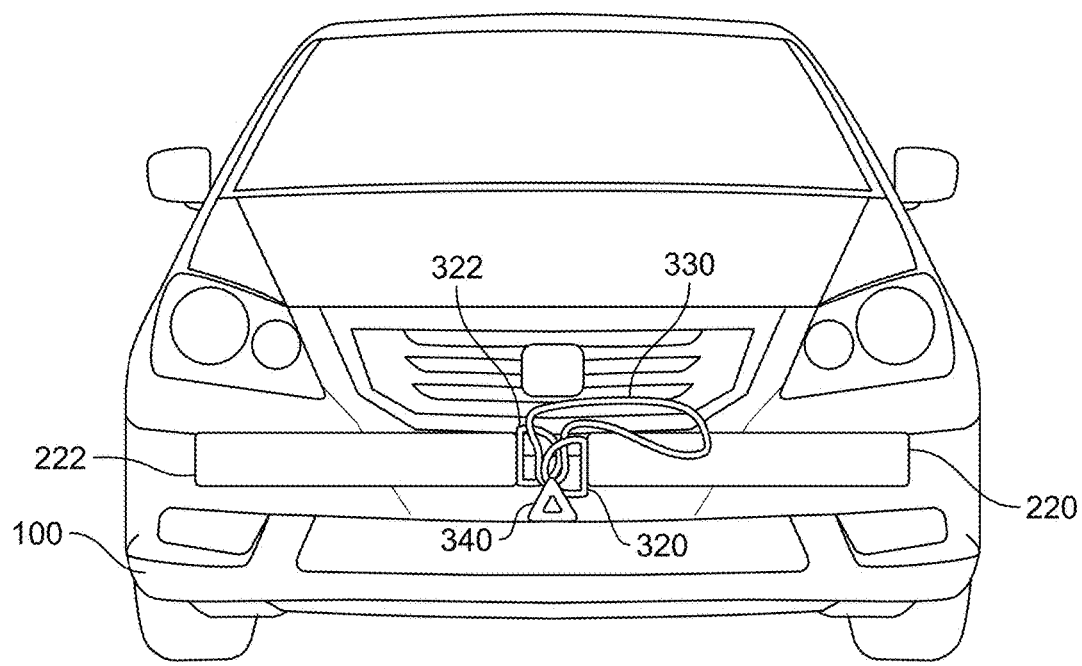
FIG. 3 is an example illustration of a front, external view of a vehicle in accordance with aspects of the disclosure.

Each external airbag may be tethered to one or more adjacent airbags. In this regard, each external airbag may include one or more connectors, such as a loop, pulley, chain, hook, etc. Each connector may be made of metal, plastic, or a strong fabric, such as nylon, polyester, or other such material. For example, as shown in FIG. 3, external airbag 220 is attached to a connector 320 and an adjacent external airbag 222 is attached to connector 322.

Each connector may be attached to a tether which may be secured to the vehicle. The tether may be a single loop, or multiple loops, which pass through the connectors of two or more adjacent airbags. Each tether may be made of nylon and/or polyester rope, cable, flexible wire, etc. For example, as further shown in FIG. 3, a tether 330 which includes a single loop is attached to the vehicle at bracket 340. Each external airbag 220 and 222 are attached to the tether 330 via connectors 320 and 322, respectively.

The tether may be pulled taut by one or more of the external airbags. In this regard, once one of the external airbags is deployed, the connector on that respective airbag may cause the tether to be pulled taut. Subsequently or at the same time, the other airbags attached to the tether may also be deployed and guided along the tether as the connector of the adjacent airbag travels along the taut tether. For instance, as shown in FIG. 4A, external airbag 222 is deployed in a first direction 401 perpendicular to the ground on which the vehicle 100 is positioned.

As an example, upon deployment of external airbag 222, the connector 322 of external airbag 222 may pull the tether 330 taut. Subsequently, the adjacent external airbag 220 may deploy and the connector 320 of external airbag 220 may be guided along the tether 330, as the connector of the external airbag 220 travels along the taut tether as shown in the FIG. 4B.

Figure 4C:
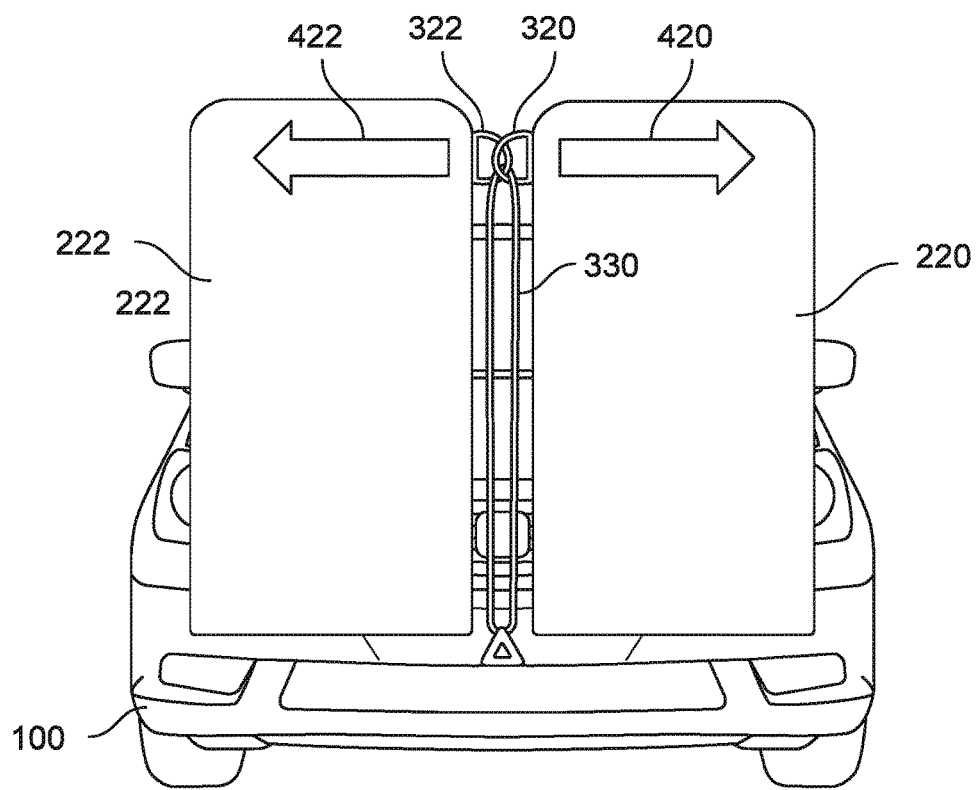

Once the external airbags are fully deployed, the connectors of the external airbags may reduce or prevent the external airbags from pulling apart from one another during impact with an object or pedestrian. In this regard, the connectors may counter the opposite pulling forces imparted on the external airbags. For instance, upon impact with an object, external airbags 222 and 220 may be subjected to opposing, pulling forces 422 and 420, respectively, as shown in FIG. 4C. The connectors 322 and 320, in conjunction with the taut tether 330, may prevent the pulling forces 420 and 422 from separating the connectors of external airbags. This, in turn, may prevent the airbags from separating from one another. In other words, at this point, the tether 330 is already taut, so the pulling forces exerted by the connectors 322 and 320 are unable to pull away from the tether 330. The connectors in conjunction with the tether may also prevent rotation of individual airbags by improving torsional rigidity of the airbag system during deployment and impact.

Although FIGS. 4A-4C show a single external airbag deploying and then a subsequent airbag deploying, the airbags may be deployed simultaneously. In some instances, more than two airbags may be attached to a tether and an airbag may be attached to more than one tether. In addition, although FIGS. 2B-4C show the external airbags 220 and 222 at the front of the vehicle 100, as noted above, external airbags may be positioned anywhere on the vehicle.

Figure 5:
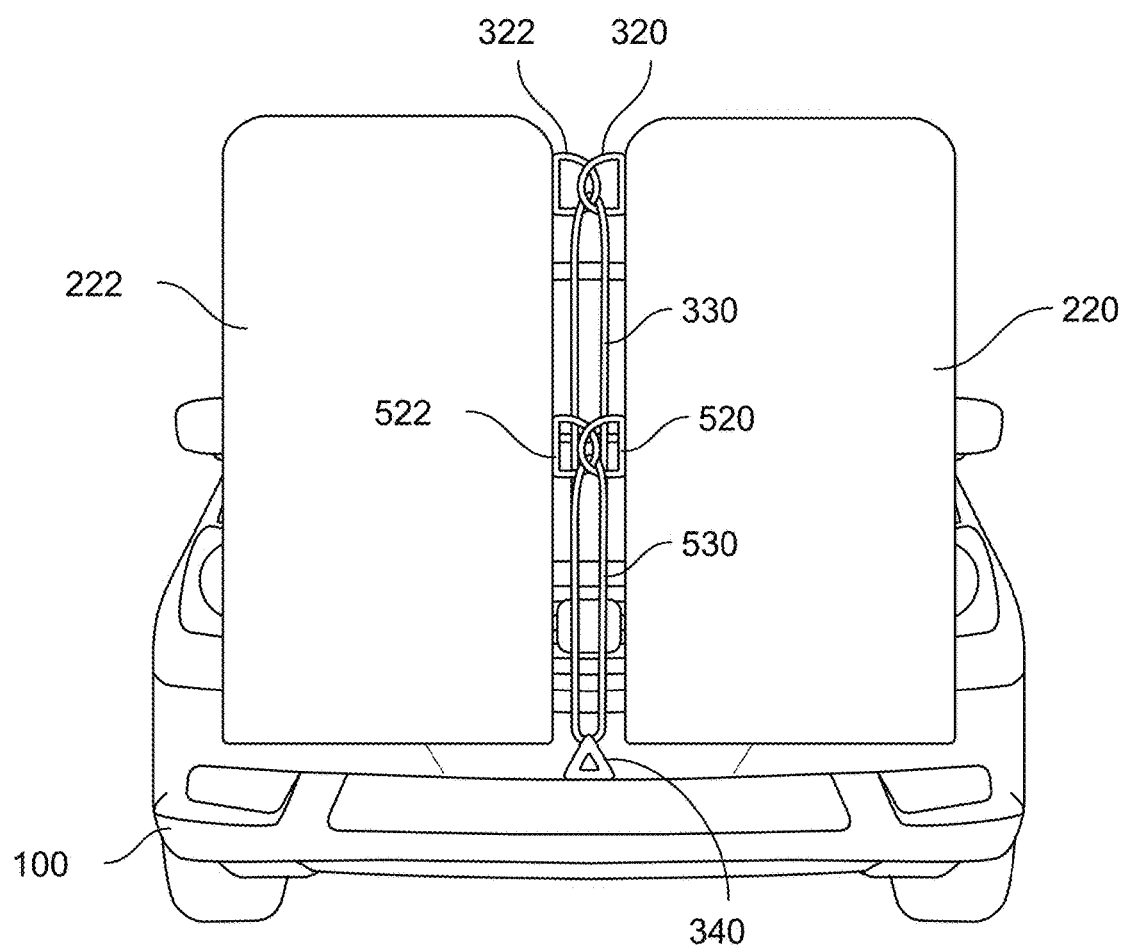
FIG. 5 is an example illustration of external airbags connected to multiple tethers in accordance with aspects of the disclosure.

Multiple connectors may be used to join external airbags to multiple tethers. In this regard, an external airbag which is connected to a single tether at a single point may be prone to torsional rotation upon impact with an object. In other words, an external airbag may twist during impact if the external airbag is only connected to a single tether. By connecting the external airbag to multiple tethers, the external airbag may become more torsional rigid. Depending on the amount of torsional rigidity desired, the number of tethers and connectors may be adjusted. In this regard, torsional rigidity may be increased with multiple connectors. For instance, a second tether 530 may be attached to bracket 340 as shown in FIG. 5. In addition to connectors 320 and 322, which are attached to tether 330, external airbags 220 and 222 may include additional connectors 520 and 522, respectively. These additional connectors 520 and 522 may be connected to tether 530. In some instances, external airbags may be connected to a single tether at multiple points, using more than one connector. In addition, multiple connectors at different heights may also help prevent separation of airbags from the middle (at lower height) in the event of impact with smaller pedestrian/object.

Figure 6A:
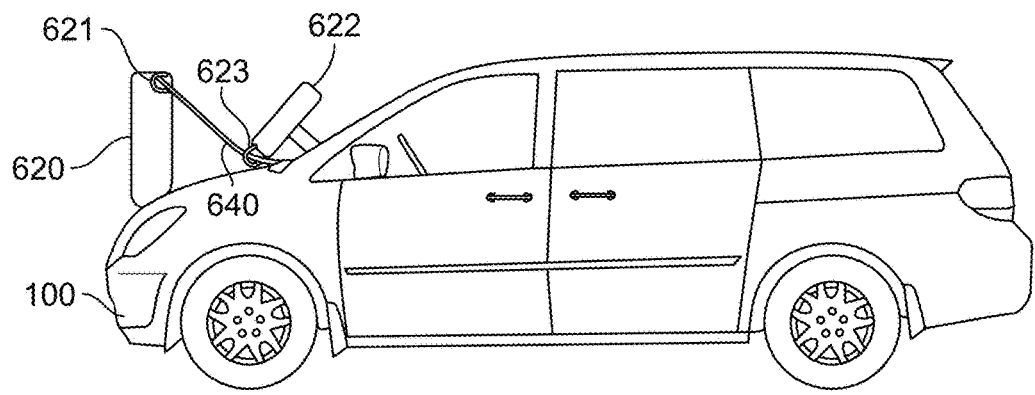
FIGS. 6A-6B are example illustrations of external airbags arranged vertically relative to each other in accordance with aspects of the disclosure.

Although the examples of FIGS. 3-4B depict external airbags 220 and 222 in a horizontal or side by side arrangement relative to one another, the external airbags may also be positioned vertically relative to one another. In this regard, a first airbag may deploy above or below another airbag relative to the ground. A connector on the first airbag may pull a tether taut. A second airbag may be subsequently or simultaneously deployed and guided along the tether above or below the first airbag. For instance, as shown in FIG. 6A, external airbag system may include a first external airbag 620 and a second external airbag 622. The first and second external airbags may include connectors 621 and 623, respectively, which are each connected to a tether 640. Upon deploying, the connector 621 of external airbag 620 pulls tether 640 taut, as further shown in FIG. 6A.

Figure 6B:
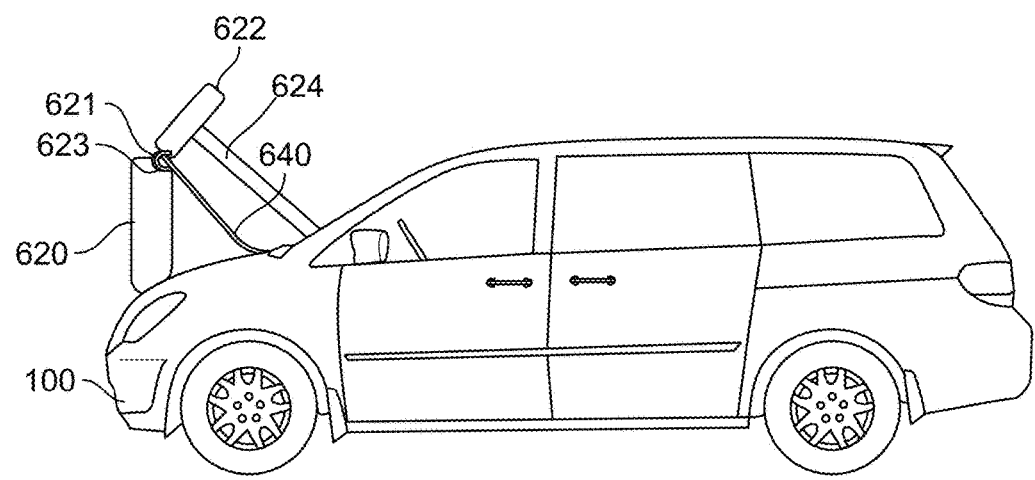

Subsequently or simultaneously to the deployment of the first external airbag 620, the second external airbag may be deployed. In this regard, the connector 623 may travel along the tether 640, guiding the second external airbag 622 above the first external airbag 620, as shown in FIG. 6B. The second external airbag 622 may include an inflatable or otherwise expandable support 624 to assist in keeping the second external airbag 622 in position when deployed. The support 624 may be constructed of nylon, polyester, and/or other such materials typically used to make airbags and may be deployed simultaneously or subsequently to the deployment of the second external airbag. In some instances, the support may be a part of the second external airbag 622.

Figure 7:
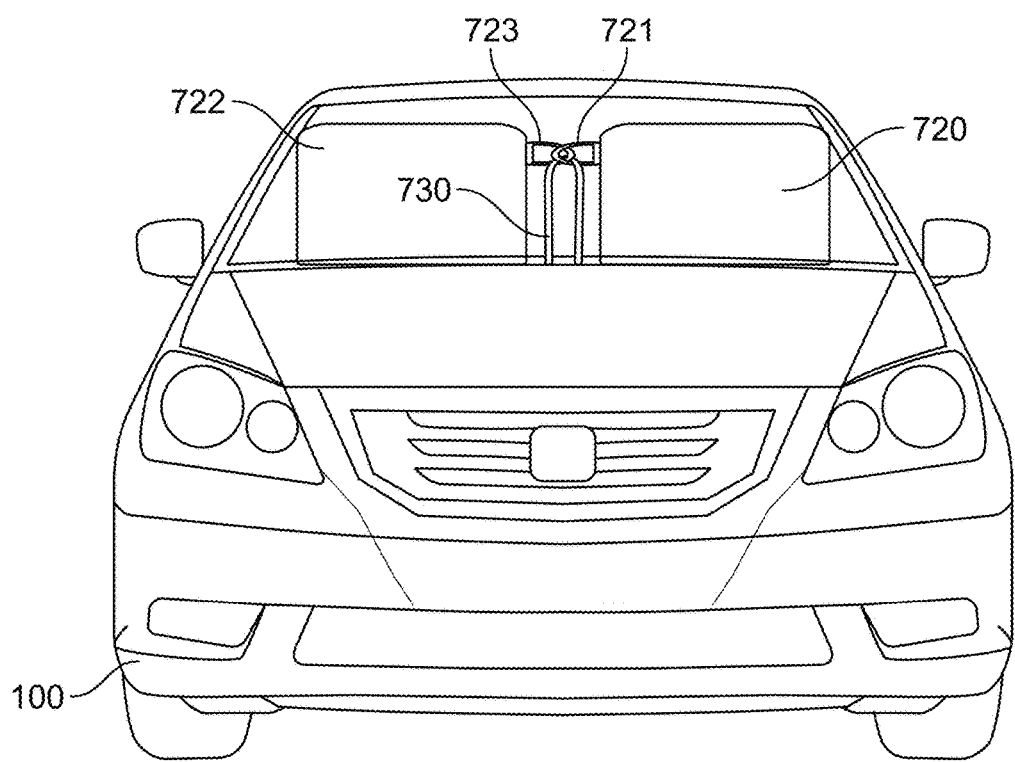
FIG. 7 is an illustration of interior airbags in accordance with aspects of the disclosure.

Although the examples above relate to external airbags of an active external airbag system, interior airbags may also be tethered together to protect occupants of the vehicle. For example, as shown in FIG. 7, interior airbag 720 is attached to a connector 721 and an adjacent interior airbag 722 is attached to connector 723. Each connector may be attached to an interior tether which may be secured to the vehicle, such as to the vehicle's room, floor, side panels, etc. The tethers may also help attach the airbag to the side panels of the vehicle. For example, as further shown in FIG. 7, an interior tether 730 that includes a single loop is attached to the vehicle 100. Each interior airbag 720 and 722 is attached to the tether 730 via connectors 721 and 723, respectively. As with the other examples, tether 730 may be pulled taut by one or more of the interior airbags. In this regard, once one of the interior airbags is deployed, the connector on that respective airbag may cause the tether to be pulled taut. Subsequently or at the same time, the other interior airbag attached to the tether may also be deployed and guided along the tether as the connector of the adjacent airbag travels along the taut tether. Similar to the exterior airbags, the interior airbags may be deployed simultaneously. In some instances, more than two interior airbags may be attached to a tether and an airbag may be attached to more than one tether.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
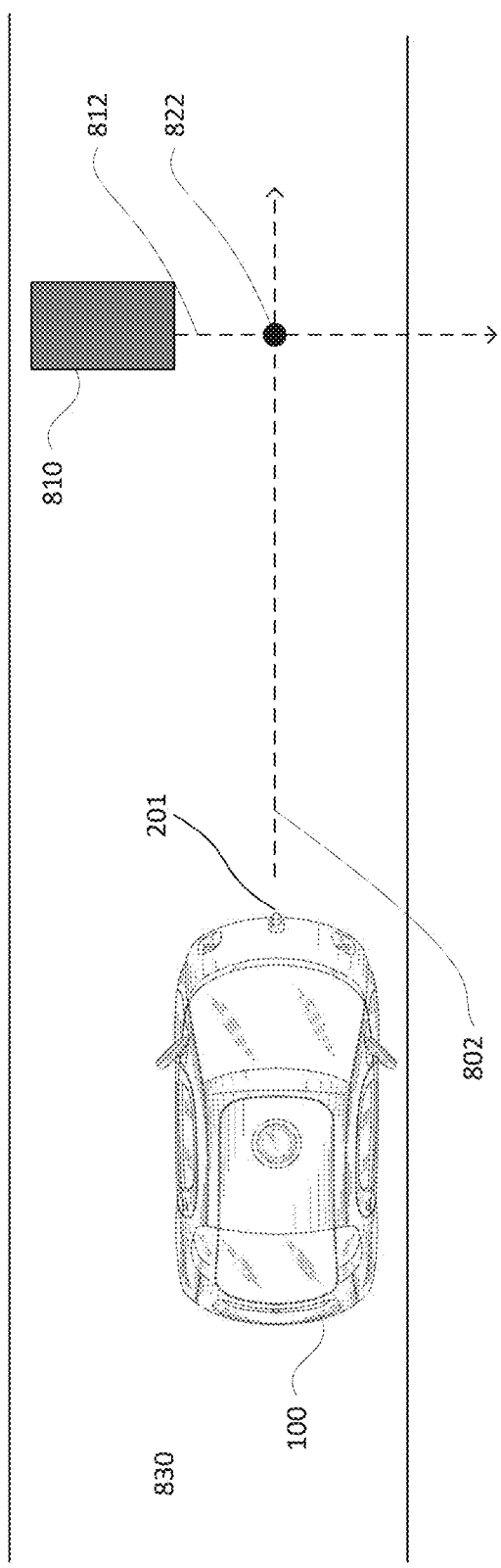
FIG. 8 is an example situational diagram in accordance with aspects of the disclosure.

Prior to deploying the safety mechanisms, vehicle's computing devices may use information from the vehicle's sensors to identify and track objects in the vehicle's environment. For example, one or more computing devices of the perception system 172 may use information form the vehicle's sensors to detect and identify the characteristics (size, speed, shape, direction, object type, etc.) of various objects in the vehicle's environment. FIG. 8 is an example 800 bird's eye view of vehicle 100 as it drives along roadway 830 in the direction of arrow 802. In this example, the one or more computing devices of the perception system 172 may identify, among other things, the location and objects in the vehicle's environment, such as object 810. After a brief period of tracking the object, the perception system 172 may determine the speeds and headings of the object as shown by arrows 812.

In addition, the vehicle's computing devices may use the characteristics of the object 810, such as speed and heading, to predict future locations where the object 810 will be. For example, as shown in example 800 of 8, direction arrow 802 represents predicted future locations of vehicle 100 and arrow 812 represents the predicted future locations of object 810. Because the predicted future locations of these objects is just that, a prediction, predictions may quickly become less accurate the farther into the future they become.

The vehicle's computing devices may also determine whether the future locations indicate that the vehicle will collide with the object. For example, the perception system or computing device 110 may determine that an impact with object 810 is likely to occur at the locations of predicted impact point 822. This impact point may be defined as a three-dimensional coordinate (X, Y, Z) in space such as latitude, longitude, and altitude or similar.

In most cases, if a collision is likely, the vehicle's computing devices may maneuver the vehicle in order to avoid the object. For example, computing device 110 may use the steering, acceleration and deceleration systems to maneuver vehicle 100 out of the path of object 810.

However if there is not enough time to avoid the object, (i.e. not enough distance, not enough braking power, not enough room to go around or avoid etc.) the vehicle's computing devices may determine that an impact with the object is imminent. For example, an impact may be imminent, when an impact is predicted to occur within a predetermined period of time, such as a few seconds or more or less. When an impact is imminent, the vehicle's protection system 174 may send a signal to deploy the external airbags.

This triggering signal may be sent for example by computing device 110, laser sensor 214, or the one or more computing devices of protection system 174. This signal may cause an external airbag on the vehicle to deploy. For example, as shown in FIG. 8, the front of the vehicle 100 may be predicted to impact object 810 at point 822. As such, the computing device 110 may send a triggering signal to deploy the external airbags in airbag system 201 prior to the impact.

Figure 9:
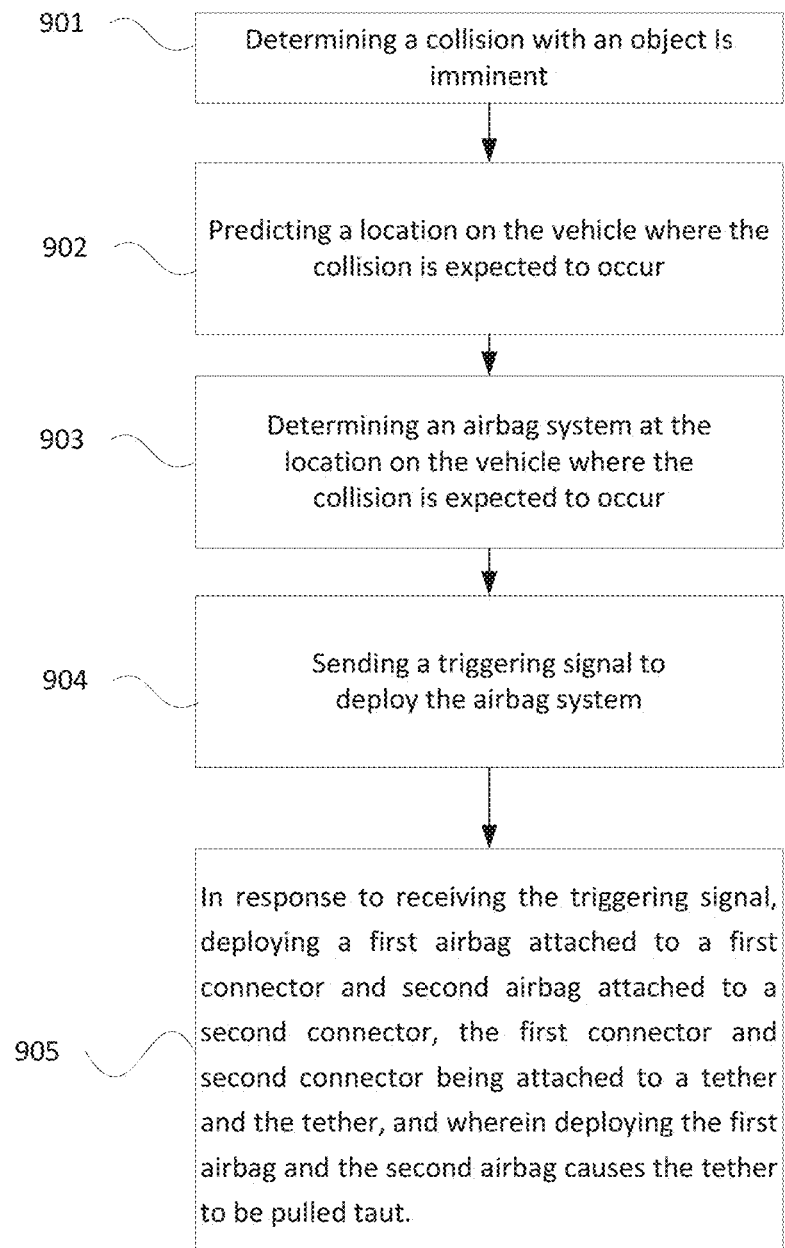
FIG. 9 is an example flow diagram in accordance with aspects of the disclosure.

FIG. 9 is an example flow diagram 900 including a method for reducing likelihood of injury or damage to an object in a collision with a vehicle, in accordance with some of the aspects described above. For example, at block 901, a determination that a collision with an object is imminent. At block 902 the location on the vehicle where the collision with the object is expected to occur may be detected and a determination of a first external airbag of one or more external airbags at the location on the vehicle where the collision is expected to occur may be made, as shown in block 903. A triggering signal may be sent to deploy the first external airbag as shown at block 904 and in response to receiving the triggering signal, deploying a first airbag attached to a first connector and second airbag attached to a second connector, the first connector and second connector being attached to a tether and the tether, and wherein deploying the first airbag and the second airbag causes the tether to be pulled taut, as shown in block 905. In some embodiments more than one external airbag may be deployed.

Although the examples described herein are related to the use of vehicles when operating in autonomous driving modes, such features may also be useful for vehicles operating in manual or semi-autonomous modes or for vehicles having only manual driving mode and/or semi-autonomous driving modes. In such cases, an active safety mechanism may be identified as discussed above. However, when making the determination as to whether to deploy the active safety mechanism and/or control the vehicle as discussed above, the reaction time of the driver may be compared with the estimated time at which an impact with an object is expected to occur. Reaction times may be determined, for example, by monitoring a specific driver's reaction times over time or by using average or expected reaction times for drivers in general. If the reaction time is too slow, the vehicle's computing device may then use the estimated time when an update will be received to determine whether to deploy the active safety mechanism and, in the case of a vehicle with such capabilities to take control and maneuver the vehicle as discussed in the examples above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An airbag system comprising:
a first airbag attached to a first connector;
a second airbag attached to a second connector;
a tether attached to a vehicle at a first end of the tether; and
wherein the tether is configured to be pulled taut upon the first or second airbag being deployed in an environment of a vehicle in order to reduce the likelihood of an object colliding directly with the vehicle, and wherein the tether is further configured to be pulled taut by the first or second connector pulling on a second end of the tether upon the first or second airbag being deployed.

2. The system of claim 1, wherein the second airbag is configured to be deployed subsequently to the first airbag.

3. The system of claim 2, wherein the second connector is configured to slide along the taut tether.

4. The system of claim 1, wherein the second airbag is configured to be deployed simultaneously to the first airbag.

5. The system of claim 1, wherein the first and second airbag are positioned adjacent to each other.

6. The system of claim 5, wherein the tether is positioned between the first and second airbags.

7. The system of claim 1, further including:
a third connector attached to the first airbag;
a fourth connector attached to the second airbag; and
a second tether, wherein the third and fourth connectors are attached to the second tether and the second tether is configured to be pulled taut upon a third or fourth airbag being deployed.

8. The system of claim 1, wherein the second airbag is configured to be positioned above the first airbag after being deployed.

9. The system of claim 1, wherein the vehicle's environment is the vehicle's interior and the first and second airbags are interior airbags.

10. The system of claim 1, wherein the vehicle's environment is the vehicle's exterior and the first and second airbags are external airbags.

11. The system of claim 1, wherein the airbag system is positioned on the vehicle.

12. The system of claim 1, wherein the first and second airbags, the tether, and the first and second connectors are stored in a compartment attached to the vehicle.

13. A method for deploying airbags in a vehicle's vicinity in order to reduce the likelihood of an object colliding directly with the vehicle comprising:
deploying a first airbag attached to a first connector;
deploying a second airbag attached to a second connector;
wherein a tether, attached to the vehicle at a first end of the tether, and configured to be pulled taut upon the first or second airbag being deployed in an environment of the vehicle, and wherein the tether is further configured to be pulled taut and by the first or second connector pulling on a second end of the tether upon the deployment of the first or second airbag.

14. The method of claim 13, wherein the first connector and second connector are attached to the tether.

15. The method of claim 14, wherein the connectors hold the first and second airbags together.

16. A method for deploying airbags in a vehicle's vicinity in order to reduce the likelihood of an object colliding directly with the vehicle comprising:
determining, by one or more processors, a collision with the object is imminent;
predicting, by the one or more processors, a location on the vehicle where the collision with the object is expected to occur;
determining an airbag system at the location on the vehicle where the collision is expected to occur;
sending, by the one or more processors, a triggering signal to deploy the airbag system; and
in response to receiving the triggering signal, deploying by one or more processors, a first airbag attached to a first connector and second airbag attached to a second connector, the first connector and second connector being attached to a tether, and wherein deploying the first airbag and the second airbag causes the tether to be pulled taut.

17. The method of claim 13, wherein the tether is attached to the vehicle at a first end.

18. The system of claim 5 further configured so that when one of the first or second airbag is deployed, the connector attached to the adjacent airbag is enabled to slide along the taut tether.

19. The method of claim 13, wherein the first and second airbag are positioned adjacent to each other, and so that when one of the airbags is deployed the connector attached to the adjacent airbag is enabled to slide along the taut tether.

* * * * *